US012255564B2

(12) United States Patent
Bocchiola

(10) Patent No.: US 12,255,564 B2
(45) Date of Patent: Mar. 18, 2025

(54) CIRCUIT TO PROVIDE AN OSCILLATING SIGNAL

(71) Applicant: Microchip Technology Incorporated, Chandler, AZ (US)

(72) Inventor: Cesare Bocchiola, Milan (IT)

(73) Assignee: Microchip Technology Incorporated, Chandler, AZ (US)

( * ) Notice: Subject to any disclaimer, the term of this patent is extended or adjusted under 35 U.S.C. 154(b) by 8 days.

(21) Appl. No.: 17/812,404

(22) Filed: Jul. 13, 2022

(65) Prior Publication Data

US 2023/0198447 A1 Jun. 22, 2023

Related U.S. Application Data

(60) Provisional application No. 63/265,746, filed on Dec. 20, 2021.

(51) Int. Cl.
  *H02P 27/06* (2006.01)
  *H02M 1/08* (2006.01)
  *H02M 1/44* (2007.01)
  *H02M 7/537* (2006.01)

(52) U.S. Cl.
  CPC .............. *H02P 27/06* (2013.01); *H02M 1/08* (2013.01); *H02M 7/537* (2013.01); *H02M 1/44* (2013.01)

(58) Field of Classification Search
  CPC ......... H02P 27/06; H02M 1/08; H02M 7/537; H02M 1/44
  See application file for complete search history.

(56) References Cited

U.S. PATENT DOCUMENTS

| 8,699,244 B1* | 4/2014 | Xiong | H05B 41/2827 363/37 |
| 2014/0307487 A1* | 10/2014 | Chang | H02M 1/4241 363/34 |
| 2015/0098016 A1* | 4/2015 | Otsuka | H04N 23/811 310/314 |

(Continued)

FOREIGN PATENT DOCUMENTS

| CN | 11124566 A | 6/2020 |
| CN | 111245266 * | 6/2020 |

OTHER PUBLICATIONS

Translation of CN111245266 has been attached.*

(Continued)

*Primary Examiner* — Zoheb S Imtiaz
(74) *Attorney, Agent, or Firm* — TraskBritt

(57) ABSTRACT

Examples may include an apparatus including a circuit coupled between a supply line, a return line, and a terminal. The circuit may provide an oscillating signal to the terminal. The circuit may include a first switch to couple the supply line with the terminal. The circuit may also include a second switch to couple the return line with the terminal. The circuit may also include a first inductor coupled between the first switch and the terminal. The circuit may also include a second inductor coupled between the second switch and the terminal. The circuit may also include a first diode coupled between the return line and an internal node of the first switch and the first inductor. The circuit may also include a second diode coupled between the supply line and an internal node of the second switch and the second inductor. Related systems and methods are also disclosed.

24 Claims, 9 Drawing Sheets

(56) References Cited

U.S. PATENT DOCUMENTS

2016/0359409 A1* 12/2016 Theoduloz .............. H02M 1/08
2017/0085189 A1* 3/2017 Madsen .................. H02M 1/44
2021/0061125 A1 3/2021 Nasr et al.

OTHER PUBLICATIONS

International Search Report for International Application No. PCT/US2022/073699, Oct. 27, 2022, 3 pages.
International Written Opinion for International Application No. PCT/US2022/073699, Oct. 27, 2022, 8 pages.

* cited by examiner

CIRCUIT TO PROVIDE AN OSCILLATING SIGNAL

CROSS-REFERENCE TO RELATED APPLICATION

This application claims the benefit of the priority date of U.S. Provisional Patent Application No. 63/265,746, filed Dec. 20, 2021, and titled "AN INTEGRATED FILTER FOR A HIGH-FREQUENCY INVERTER FOR MOTOR DRIVES USING SILICON-CARBIDE POWER SWITCHES," the disclosure of which is incorporated herein in its entirety by this reference.

FIELD

This description relates, generally, to a circuit to provide an oscillating signal. Some examples relate to inverters including inductors. Such inverters may be used to provide drive signals to a load (e.g., a motor), without limitation.

BACKGROUND

Some electronic inverters may provide drive signals to loads (e.g., electrical motors) that may exhibit changes in voltage over time ("dV/dt") that may exceed operational limits of the loads, cause stress in the loads, or may cause degradation of the loads over time. As a non-limiting example, a drive signal exhibiting a high change in voltage over a short period of time (e.g., several volts per nanosecond, without limitation) may cause stresses in the load which may degrade the load over time. Such dV/dt may be referred to herein as "excessive." Further, in some cases, excessive dV/dt may cause electromagnetic interference (EMI). Excessive dV/dt may be a result of the speed at which electronic switches in the inverter open or close, i.e., switching speeds of inverters. Additionally, rapid switching, such as that exhibited by silicon carbide (SiC) MOSFETs, may exhibit large power losses if changes in current over time (di/dt) are not controlled.

BRIEF DESCRIPTION THE DRAWINGS

While this disclosure concludes with claims particularly pointing out and distinctly claiming specific examples, various features and advantages of examples within the scope of this disclosure may be more readily ascertained from the following description when read in conjunction with the accompanying drawings, in which:

Figure 7:
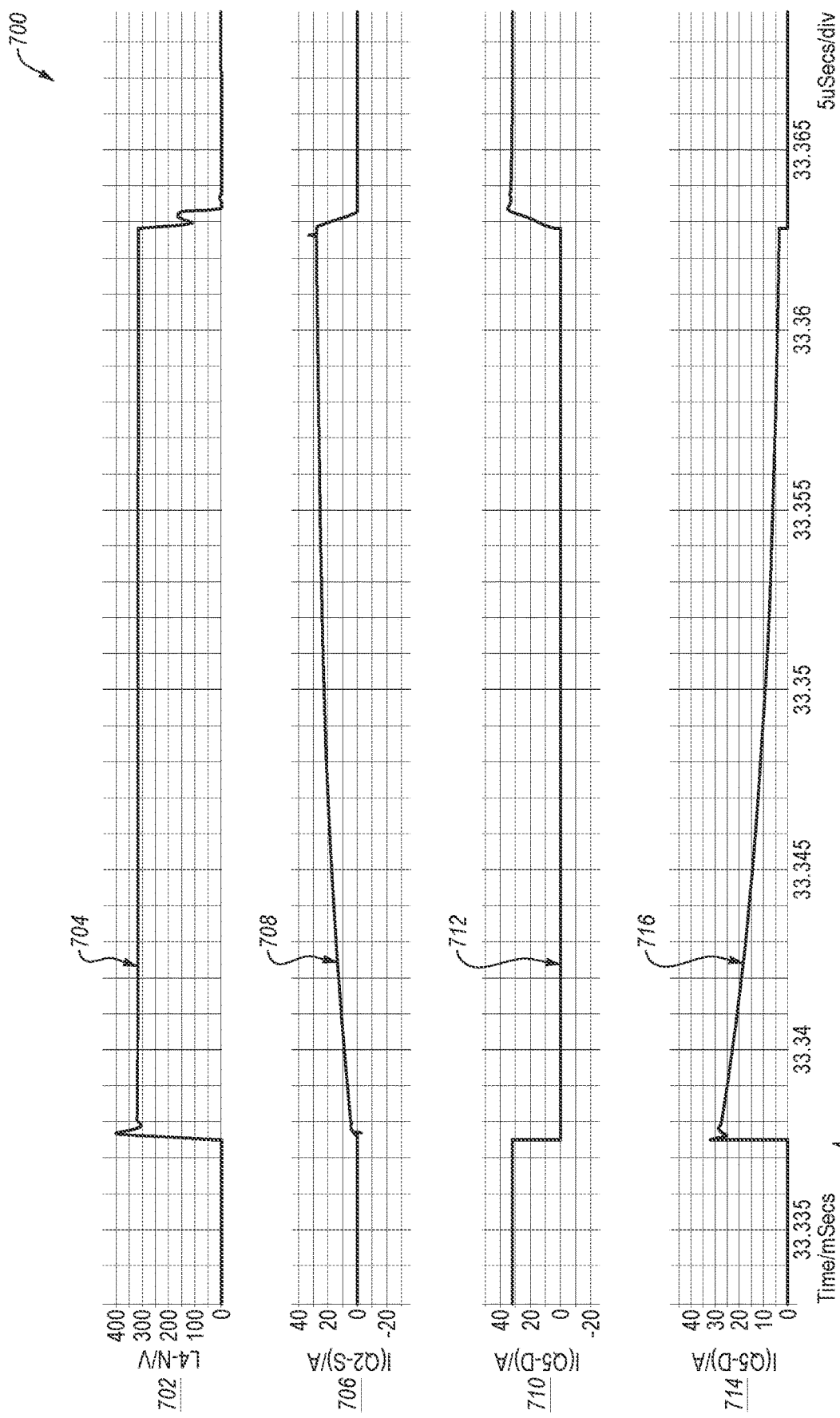

FIG. 7 includes graphs illustrating voltages and currents at various points in a circuit, according to one or more examples.

Figure 8:
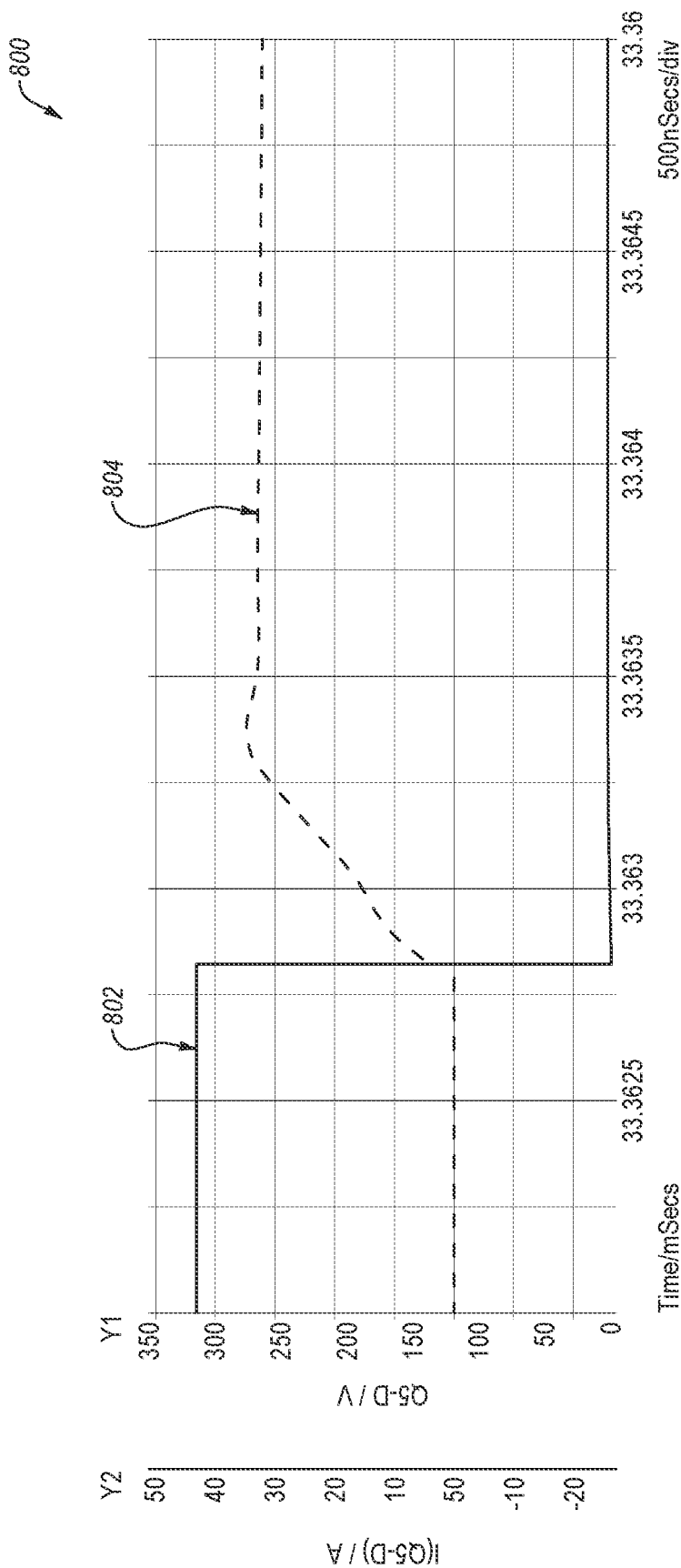

FIG. 8 illustrates a graph illustrating a drain-to-source voltage of a second switch and a current 804 through the second switch, according to one or more examples.

Figure 9:
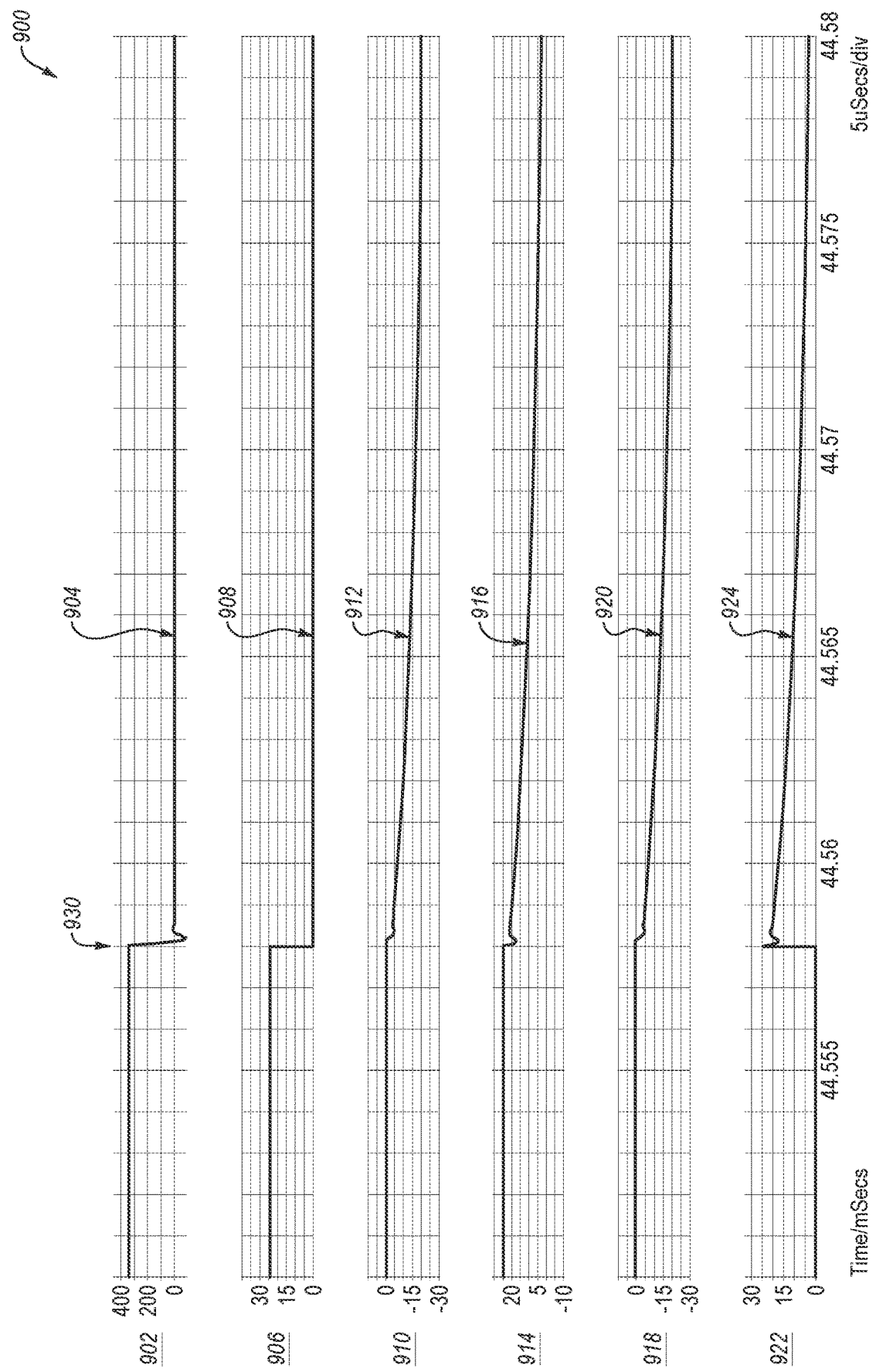

FIG. 9 includes graphs illustrating voltages and currents at various points in a circuit, according to one or more examples.

DETAILED DESCRIPTION

In the following detailed description, reference is made to the accompanying drawings, which form a part hereof, and in which are shown, by way of illustration, specific examples in which the present disclosure may be practiced. These examples are described in sufficient detail to enable a person of ordinary skill in the art to practice the present disclosure. However, other examples may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example of this disclosure to the specified components, steps, features, functions, or the like.

It will be readily understood that the components of the examples as generally described herein and illustrated in the drawing could be arranged and designed in a wide variety of different configurations. Thus, the following description of various examples is not intended to limit the scope of the present disclosure, but is merely representative of various examples. While the various aspects of the examples may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be depicted by block diagram form in order not to obscure the present disclosure in unnecessary detail. Conversely, specific implementations shown and described are only examples and should not be construed as the only way to implement the present disclosure unless specified otherwise herein. Additionally, block definitions and partitioning of logic between various blocks is an example of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, and symbols that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal. A person having ordinary skill in the art would appreciate that this disclosure encompasses communication of quantum information and qubits used to represent quantum information.

The various illustrative logical blocks, modules, and circuits described in connection with the examples disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer executes computing instructions (e.g., software code, without limitation) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, or a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

In this description the term "coupled" and derivatives thereof may be used to indicate that two elements co-operate or interact with each other. When an element is described as being "coupled" to or with another element, then the elements may be in direct physical or electrical contact or there may be one or more intervening elements or layers present. In contrast, when an element is described as being "directly coupled" to or with another element, then there are no intervening elements or layers present. It will be understood that when an element is referred to as "coupling" a first element and a second element then it is coupled to the first element and it is coupled to the second element.

Some electronic inverters may provide drive signals to loads (e.g., electrical motors) that may exhibit changes in voltage over time ("dV/dt") that may exceed operational limits of the loads, cause stress in the loads, or may cause degradation of the loads over time. As a non-limiting example, a drive signal exhibiting a high change in voltage over a short period of time (e.g., several volts per nanosecond, without limitation) may cause stresses in the load which may degrade the load over time. Such dV/dt may be referred to herein as "excessive." Further, in some cases, excessive dV/dt may cause electromagnetic interference (EMI). Excessive dV/dt may be a result of the speed at which electronic switches in the inverter open or close, i.e., switching speeds of inverters.

Some systems may include a passive filter between an inverter and a load (e.g., a motor). Such passive filters may decrease the impact of the switching speed of the inverter on the load. As a non-limiting example, the passive filters may limit dV/dt at terminals of the load despite switching speeds of the electronic switches.

Silicon Carbide (SiC) metal-oxide semiconductor field-effect transistors (MOSFETs) may exhibit faster switching speeds than other electronic switches (e.g., silicon electronic switches including e.g., MOSFETS or insulated-gate bipolar transistors (IGBTs), without limitation). Thus, inverters using SiC MOSFETs may result in dV/dt at terminals of a load that are excessive, for example, dV/dt that is greater than dV/dt resulting from inverters including other electronic switches.

One or more examples may include a passive filter that may be more effective at limiting dV/dt than conventional passive filters. The passive filter may keep dV/dt within acceptable limits. As a non-limiting example, the passive filter may keep dV/dt at terminals of a load (e.g., an electrical motor) within acceptable limits for the load.

One or more examples may include an inverter for a load (e.g., an electrical motor), the inverter including SiC MOSFETs. Such examples may also include one or more instances of a passive filter such that the one or more passive filters limit dV/dt, despite the inherently fast switching speeds of the SiC MOSFETs.

One or more examples may include inverters that themselves exhibit higher efficiency and further that may allow loads driven thereby to exhibit higher efficiency than other inverters or than loads driven by typical inverters. As a non-limiting example, one or more examples may exhibit increased efficiency as a result of including SiC MOSFETs rather than other electronic switches.

Further, one or more examples may allow for better control of electrical stresses applied to a load as a result of drive signals applied at terminals than other inverters. As a non-limiting example, passive filters as described herein may allow inverters to decreases electrical stresses applied to a load by limiting dV/dt at terminals of the load, and thereby increase reliability of the load.

Further, one or more examples may limit a change in current over time ("di/dt") which may allow for enhancing efficiency of inverters by reducing turn-on losses of switches compared with other inverters. As a non-limiting example, by using passive filters as described herein, di/dt may be limited, which may in turn decrease turn-on losses of electronic switches of inverters. In some inverters or loads, turn-on losses may represent a significant portion of total power losses.

Although some examples described herein refer to electrical motors, this disclosure is not so limited. One or more examples may be used in any inverter (including, e.g., multi-stage inverters, without limitation) (whether solid-state or not solid-state) designed to drive any suitable load.

Some suitable loads may exhibit inductive behavior. For example, some suitable loads may have an inductance greater than inductance of inductors included in passive filters of the inverter. The inductance may be high enough to not interfere with the operation of the examples during the switching frequency period. As non-limiting examples, suitable loads include electrical motors (including e.g., multi-phase electrical motors), and line transformers (e.g., multi-phase line transformers). In one non-limiting example, the inductance of the load is more than 1,000 times greater than the combined inductances of the inductor.

One or more examples may have application in high-power motors (e.g., motors that operate using several kilowatts, without limitation). In such applications, even small gains in efficiency may result in economic benefits. Examples are not, however, limited to high-power applications.

One or more examples included SiC MOSFETs. Other examples may include silicon MOSFETS, Insulated Gate Bipolar Transistors (IGBTs), or other switches, without limitation.

Figure 1:
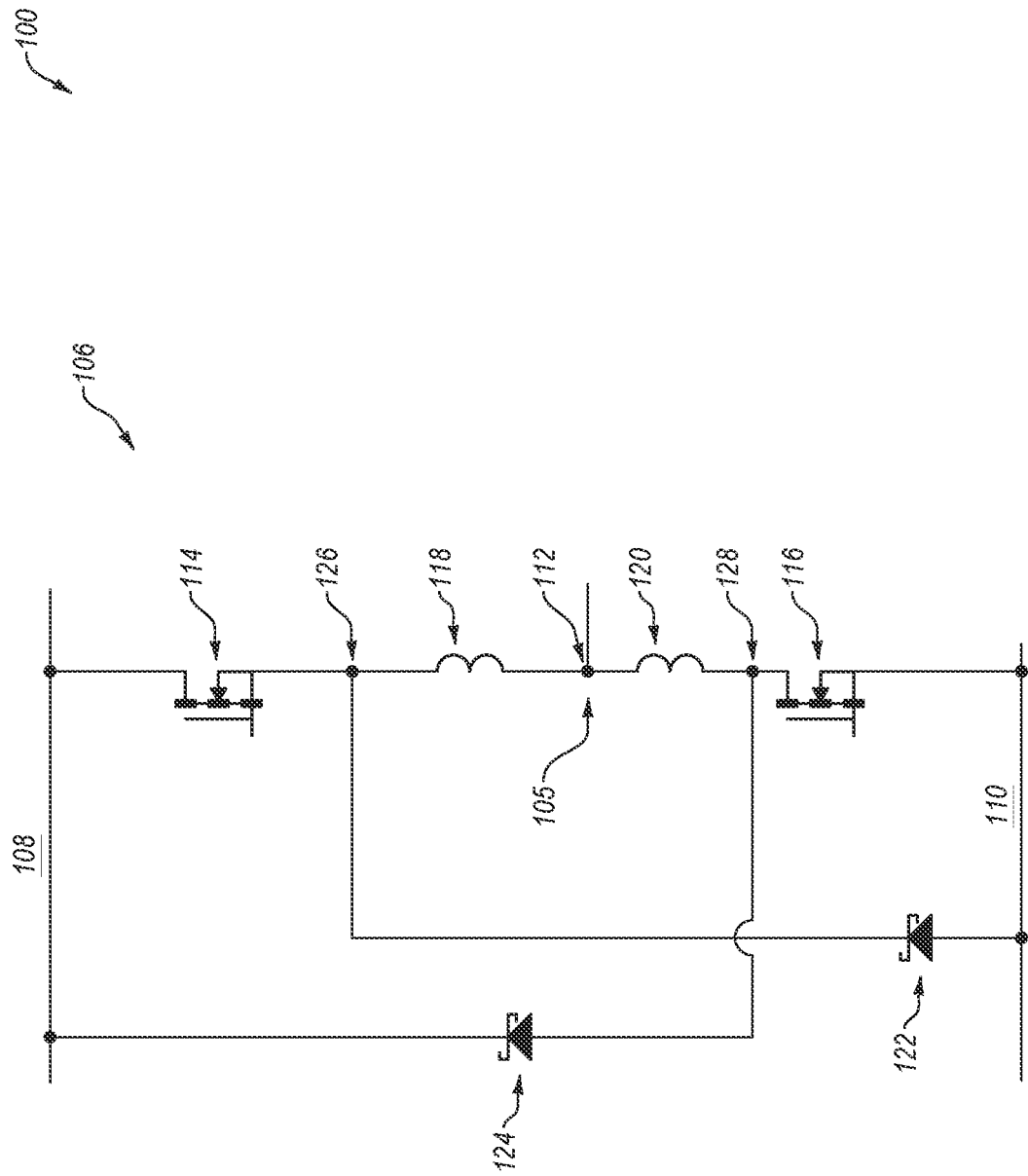
FIG. 1 is a functional block diagram illustrating an apparatus according to one or more examples.

FIG. 1 is a functional block diagram illustrating an apparatus 100 according to one or more examples. Apparatus 100 includes a circuit 106 (which circuit 106 may be an inverter) which may efficiently drive a load (e.g., a multi-phase motor) while limiting dV/dt at a terminal 112, which may be coupled to the load. Circuit 106 may, additionally or alternatively, limit di/dt in circuit 106 (e.g., at a first switch 114 and a second switch 116) and/or in the load. As indicated above, apparatus 100 may find application in relation to a multi-phase motor, but is not limited to such an application.

Apparatus 100 may include a circuit 106 coupled between a supply line 108, a return line 110, and a terminal 112. Circuit 106 may provide an oscillating signal 105 to terminal 112. Circuit 106 may include first switch 114 to couple supply line 108 with terminal 112. Circuit 106 may include second switch 116 to couple return line 110 with terminal 112. Circuit 106 may include a first inductor 118 coupled between first switch 114 and terminal 112. Circuit 106 may include a second inductor 120 coupled between second switch 116 and terminal 112. Circuit 106 may include a first diode 122 coupled between return line 110 and a first internal node 126, first internal node 126 common to both first switch 114 and first inductor 118. Circuit 106 may include a second diode 124 coupled between supply line 108 and a second internal node 128, second internal node 128 common to both second switch 116 and second inductor 120.

Circuit 106 may provide oscillating signal 105 at terminal 112 for a motor (e.g., as a control signal of a multi-phase motor (not illustrated in FIG. 1)). The multi-phase motor is given as an example of something to be driven by circuit 106. The multi-phase motor may be an electrical motor to be driven by a drive signal at one or more terminals. The multi-phase motor may include three phases and three terminals. Circuit 106 may likewise include three phases (not illustrated in FIG. 1 for descriptive purposes).

Circuit 106 may generate or provide oscillating signal 105 (e.g., to a multi-phase motor) by alternately electrically coupling terminal 112 to supply line 108 and to return line 110. Supply line 108 may provide positive voltage, and current, e.g., for operation of the load (e.g., the multi-phase motor), without limitation. Return line 110 may be an electrically conductive line to provide a return path for the current. Terminal 112 may be an electrical node of circuit 106. Terminal 112 may be for electrical coupling to a terminal of the load.

First switch 114 may electrically couple terminal 112 to supply line 108 and second switch 116 may couple terminal 112 to return line 110. One or the other of first switch 114 and second switch 116 may be closed at a time. Thus, first switch 114 and second switch 116 may alternately electrically couple terminal 112 to supply line 108 and return line 110, with a dead time optionally provided between opening one of first switch 114 and second switch 116 and the closing of a second one of first switch 114 and second switch 116. First switch 114 and second switch 116 may be controlled by a modulator (not illustrated in FIG. 1). First switch 114 or second switch 116, or both, may be a SiC MOSFET.

First inductor 118 may be coupled between first switch 114 and terminal 112. Second inductor 120 may be coupled between second switch 116 and terminal 112. First inductor 118 and second inductor 120 may collectively be a passive filter or portions of a passive filter. As a non-limiting example, first inductor 118 and second inductor 120 may respectively resist a change in current flow ("di/dt") into, or out of, terminal 112. Utilizing half of the cycle for case of understanding, when current flows into terminal 112 from the load, first inductor 118 may resist a change in a first electrical current from terminal 112 to first internal node 126 and second inductor 120 may resist a change in a second electrical current from terminal 112 to second internal node 128, respectively. It is to be understood that during the second half of the cycle, the above current directions are reversed, but for ease of understanding will not be further detailed. Thus, first inductor 118 may limit di/dt of the current flowing through the load and first switch 114. Limiting di/dt may reduce turn-on losses in first switch 114, during the half of the cycle, it being understood that similarly second inductor 120 may limit di/dt of the current flowing through the load and second switch 116 during the second half of the cycle. Additionally, first inductor 118 and second inductor 120 may, in combination with a first capacitor coupled between supply line 108 and terminal 112 and a second capacitor coupled between return line 110 and terminal 112 (neither the first capacitor nor the second capacitor is illustrated in FIG. 1), limit dV/dt.

First inductor 118 and second inductor 120 may be separate inductors, e.g., on separate sides of terminal 112, without limitation. First inductor 118 and second inductor 120 being separate, and on either side of terminal 112, may be advantageous over alternative inverters including a single inductor, for example, between terminal 112 and the load because first inductor 118 and second inductor 120, as separate components, may more effectively limit di/dt at through first switch 114 and second switch 116 respectively. Limiting di/dt through first switch 114 and second switch 116 may decrease the turn-on losses of first switch 114 and second switch 116.

First diode 122 may be coupled between return line 110 and first internal node 126. First internal node 126 may be defined as a point between first switch 114 and first inductor 118. Second diode 124 may be coupled between supply line 108 and second internal node 128. Second internal node 128 may be defined as a point between second switch 116 and second inductor 120. First diode 122 may act as a clamping diode (or "flyback diode" or "freewheeling diode") for first inductor 118, e.g., to limit a voltage spike when first switch 114 opens and second switch 116 closes, e.g., by providing a path for a decay current, without limitation. Second diode 124 may act as a clamping diode for second inductor 120, e.g., to limit a voltage spike when second switch 116 opens and first switch 114 closes, e.g., by providing a path for a decay current, without limitation. In one non-limiting example, the inductance of the load is more than 100 times greater than the combined inductances of the first and second inductors 118, 120. In another non-limiting example, the inductance of the load is more than 1,000 times greater than the combined inductances of the first and second inductors 118, 120.

Figure 2:
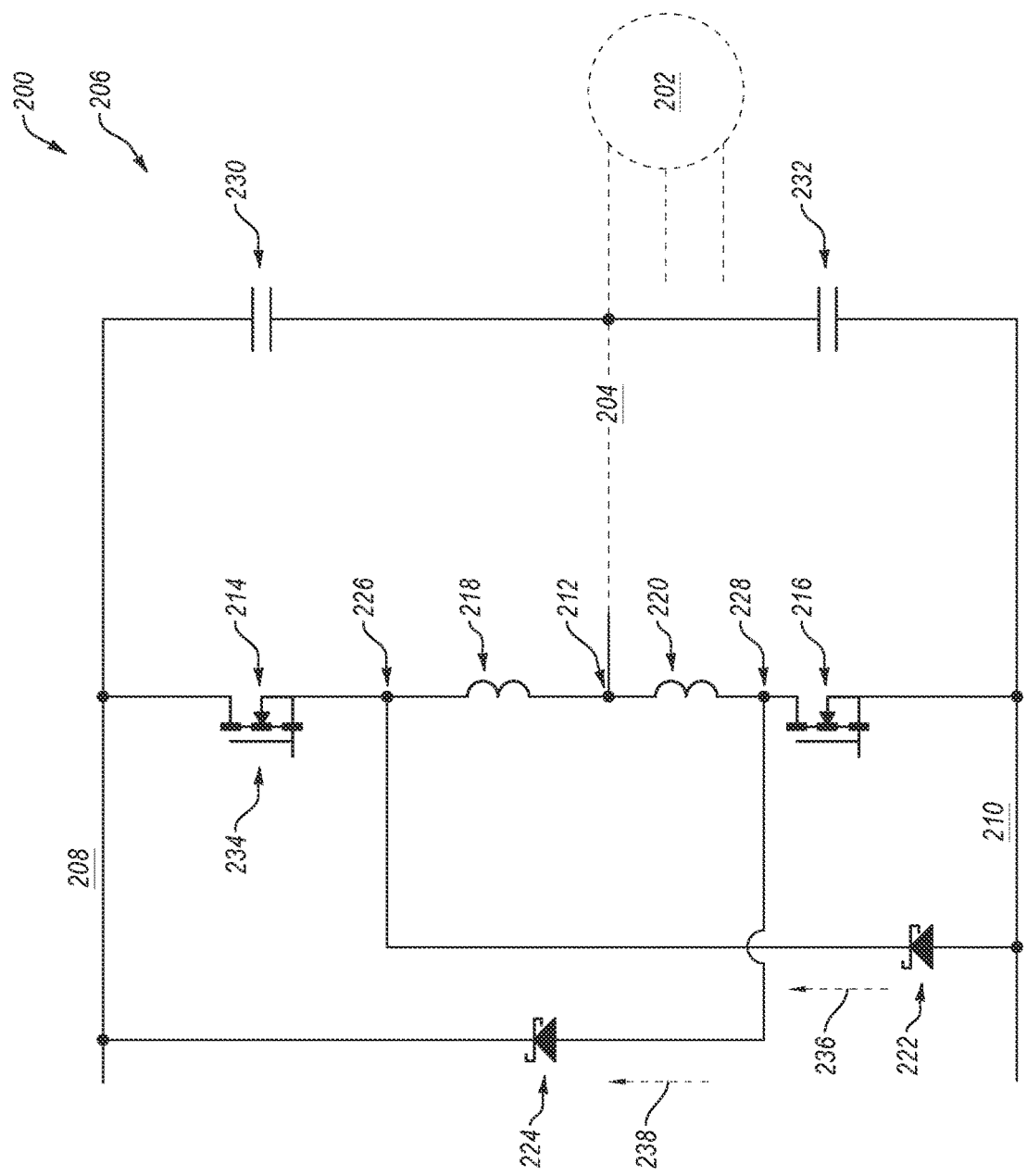
FIG. 2 is a functional block diagram illustrating an apparatus according to one or more examples.

FIG. 2 is a functional block diagram illustrating an apparatus 200 according to one or more examples. Apparatus 200 includes a circuit 206 (which circuit 206 may be an inverter) which may efficiently drive a load 202 (e.g., a multi-phase motor) while limiting dV/dt at a terminal 204 of load 202. Circuit 206 may, additionally or alternatively, limit di/dt in circuit 206 (e.g., at a first switch 214 and a second switch 216) and/or in load 202.

In the present disclosure, elements of some drawings or apparatuses may be the same as, or substantially similar to, elements of other drawings or other apparatuses. Thus, a reference number having the same last two digits as a corresponding reference number in another drawing, may indicate that elements referenced by the respective reference numbers are substantially the same, absent explicit description to the contrary. As a non-limiting example, first switch 214 of FIG. 2 may be the same as, or substantially similar to first switch 114 of FIG. 1. Load 202 is optional in apparatus 200. The optionality of load 202 and of terminal 204 (and the other illustrated terminals of load 202) is illustrated by load 202 and terminal 204 (and the other terminals) being illustrated using dashed lines.

In addition to elements that are the same as, or substantially similar to elements of apparatus 100 of FIG. 1, apparatus 200 includes a first capacitor 230 and a second capacitor 232. First switch 214 may be a SiC MOSFET 234. First diode 222 may define part of first path 236 and second diode 224 may define part of second path 238.

In one or more examples, first capacitor 230 may be coupled between supply line 208 and terminal 212. Further, second capacitor 232 may be coupled between return line 210 and terminal 212. First capacitor 230 or second capacitor 232 may be part of a passive filter, e.g., to limit dV/dt at terminals 212, 204, without limitation. First inductor 218 and second inductor 220 in combination with first capacitor 230 and second capacitor 232 may limit dV/dt at terminal 212. First inductor 218 and second inductor 220 may limit di/dt at terminal 212 (e.g., as described above with regard to first inductor 118 and second inductor 120) and, as indicated, may also (in combination with first capacitor 230 and second capacitor 232) limit dV/dt at terminal 212.

First diode 222, acting as a clamping, flyback or freewheeling diode, may provide first path 236 for a first decay current. Likewise, second diode 224, acting as a clamping, flyback or freewheeling diode, may provide a second path 238 for a second decay current. Additionally, first diode 222 may prevent current to flow from first internal node 226 to return line 210. Similarly, second diode 224 may prevent current to flow from supply line 208 to second internal node 228.

As a non-limiting example of contemplated operations of circuit 206, circuit 206 may provide a sinusoidal current at terminal 204, through terminal 212 of circuit 206, into load 202. While providing the sinusoidal current, there may be four transitions. Description is provided relative to each of the four transitions.

Before a first transition the load current may flow from load 202 into circuit 206 at terminal 212. Before the first transition, second switch 216 may be closed, and first switch 214 may be open. Before the first transition, the voltage at terminal 212 may be the same as the voltage at return line 210, second capacitor 232 may be fully discharged and first capacitor 230 may be charged to have a potential thereacross equal to the voltage of supply line 208, less the voltage of return line 210, which for case of understanding will be assumed to be ground, without limitation. The load current may flow through second inductor 220 and second switch 216.

At the first transition, second switch 216 may open and, after an optional dead time, first switch 214 may close. Current from second inductor 220 may be diverted from second switch 216 into second diode 224, which second diode 224 may become forward biased and may clamp the drain voltage of second switch 216 at the voltage of supply line 208. Initially, the current flowing through second inductor 220 is the same as the current flowing from load 202, and thus no current is initially available to charge second capacitor 232, and discharge first capacitor 230. Additionally, initially second diode 224 clamps the voltage at second internal node 228 to be roughly equal to the voltage of supply line 208, while the voltage at terminal 212 remains at the voltage of return line 210 due to first and second capacitors 230, 232, which voltage condition begins to discharge second inductor 220.

As second inductor 220 begins to discharge, some of the load current may begin to discharge first capacitor 230 and charge second capacitor 232, and as a result the voltage at terminal 212 slowly rises. After the voltage at terminal 212 has reached the potential of supply line 208, a small overshoot of the voltage at terminal 212 above the voltage of supply line 208 may occur because of resonance between the parallel operation of first capacitor 230 and second capacitor 232 in combination with first inductor 218 and second inductor 220. The overshoot is limited by properly sizing first and second inductors 218 and 220, as well as first and second capacitors 230 and 232 so as to protect components of circuit 206 and/or load 202. Proper sizing is done in accordance with resonant circuit design known to those skilled in the art.

Additionally or alternatively, first inductor 218 is charged through the body diode of first switch 214 being forward biased to carry the load current, due to the overshoot. When first switch 214 is closed, initially, the current in first inductor 218 is diverted from first switch 214 body diode to the first switch 214 channel internally to first switch 214.

FIG. 7 includes graphs 700 illustrating voltages and currents at various points in a circuit (e.g., circuit 206 of FIG. 2), according to one or more examples. Graphs 700 include a graph 702 of a voltage 704 at a terminal (e.g., terminal 212 of FIG. 2) over time. Graphs 700 include a graph 706 of a current 708 in a first switch (e.g., first switch 214 of FIG. 2) and a first inductor (e.g., first inductor 218 of FIG. 2) over time, where the current rises slowly (slow di/dt) from an initial current after the first transition to a final current. Graphs 700 include a graph 710 of a current 712 in a second switch (e.g., second switch 216 of FIG. 2) over time, which was initially carrying the load current, and drops rapidly to zero when second switch 216 is opened. Graphs 700 include a graph 714 of a current 716 in a second diode (e.g., second diode 224 of FIG. 2) over time, which initially carries the load current and decays over time as second inductor 220 discharges. The first transition may occur during a first time duration 718.

Returning to the description of FIG. 2 and the transitions, before a second transition the load current may flow from load 202 into circuit 206 at terminal 212. Before the first transition, second switch 216 may be open, and first switch 214 may be closed. Before the second transition, the voltage at terminal 204 may be approximately the same as the voltage at supply line 208, and thus first capacitor 230 is fully discharged and second capacitor 232 is fully charged. The load current may flow through first inductor 218.

At the second transition, first switch 214 may be opened, and, after an optional dead time, second switch 216 may closed. When first switch 214 is opened, load current continues to flow through first inductor 218 and the body diode of first switch 214. When second switch 216 is closed, first inductor 218 is carrying almost all the load current while second inductor 220 and second diode 224 may carry some residual current. The amount of residual current depends on the duration of the control signals alternately closing and opening first switch 214 and second switch 216, which control signals may be determined by a modulator. After second switch 216 is closed, the voltage at second internal node 228 is approximately the voltage of return line 210, which begins to charge second inductor 220. The voltage at terminal 212 is constrained to change slowly due first and second capacitors 230, 232 and the rate of change of current through second inductor 220.

A portion of the load current discharges second capacitor 232 and charges first capacitor 230. The voltage at terminal 212 transitions from high to low. This transition is slowed down as the second inductor 220 charges up to the full load current. The current of second inductor 220 primarily flows into the second switch 216 after the second switch 216 has been fully closed, and, therefore, the change of current of second inductor 220 (di/dt) results in reduced transition losses.

For example, FIG. 8 illustrates a graph 800 illustrating a drain-to-source voltage 802 of a second switch (e.g., second switch 216 of FIG. 2) and a current 804 through the second switch (e.g., second switch 216), according to one or more examples. The small "bump" in current 804 is due to damping resistors in series with a first capacitor (e.g., first capacitor 230 of FIG. 2) and a second capacitor (e.g., second capacitor 232 of FIG. 2) respectively. The damping resistors are optional, and are not illustrated in FIG. 2. The damping resistors, if supplied, serve to reduce the oscillations due to the resonances between first and second inductors 218, 220 and first and second capacitors 230, 232.

Returning to the description of FIG. 2, circuit 206 (including first inductor 218, second inductor 220, first capacitor 230, and second capacitor 232) limit dV/dt at terminals 212, 204 and, at the same time, circuit 206 limits di/dt of second switch 216 during the second transition, and further limits the current through second switch 216 to be primarily after the second switch 216 has closed.

Before a third transition the load current may flow from circuit 206 into load 202 at terminal 204. Before the third transition, second switch 216 may be closed, and first switch 214 may be open. Before the third transition, the voltage at terminal 204 may be the same as the voltage at return line 210. The load current may flow through second inductor 220.

At the third transition, second switch 216 may open and, after an optional dead time, first switch 214 may close. When second switch 216 is opened, current will initially continue to flow through second inductor 220 through the body diode of second switch 216. When first switch 214 is closed, because of the effect of first inductor 218, the current change (di/dt) of the first inductor 218 and, as a result of the first switch 214, will be slow. Slowing di/dt of the first switch 214 may reduce transition losses. At the same time first inductor 218 will have voltage at terminals of first inductor 218 to be charged; which means voltage at terminals 212, 204 may remain low for the time needed first inductor 218 to be charged, in cooperation with first and second capacitors 230, 232. This also slows down the dV/dt at terminal 204.

The increasing voltage at terminals 212, 204 will now apply a voltage to second inductor 220 in the direction to discharge second inductor 220. The current into second switch 216 and second inductor 220 will then decrease until second inductor 220 is fully discharged and the body diode of second switch 216 stops conducting.

Before a fourth transition the load current may flow from circuit 206 into load 202 at terminal 204. Before the fourth transition, second switch 216 may be open, and first switch 214 may be closed. Before the second transition, the voltage at terminal 204 may be the same as the voltage at supply line 208. The load current may flow through first inductor 218.

At the fourth transition, first switch 214 may be opened, and, after an optional dead time, second switch 216 may closed. The inductance of the load 202 may then force the load current to continue to flow into some other path, i.e., other than through first switch 214. This path is provided by first diode 222, first inductor 218, first capacitor 230, and second capacitor 232. In the meanwhile, first inductor 218 may be discharged and second inductor 220 may be charged.

The voltage at terminals 212, 204 will not change very quickly (e.g., a limit to dV/dt), because of the effect of first and second capacitors 230, 232 and the discharge and charge times of first and second inductors 218, 220, respectively.

In the fourth transition, first switch 214 may stop conducting at the time it is opened; as a result the current into first inductor 218 follow a different path through first diode 222.

For example, FIG. 9 includes graphs 900 illustrating voltages and currents at various points in a circuit (e.g., circuit 206 of FIG. 2), according to one or more examples of the fourth transition. Graphs 900 include a graph 902 of a voltage 904 at a terminal (e.g., terminals 212, 204 of FIG. 2) over time. Graphs 900 include a graph 906 of a current 908 in a first switch (e.g., first switch 214 of FIG. 2) over time. Graphs 900 include a graph 910 of a current 912 in a second switch (e.g., second switch 216 of FIG. 2) over time. Graphs 900 include a graph 914 of a current 916 in a first inductor (e.g., first inductor 218 of FIG. 2) over time. Graphs 900 include a graph 918 of a current 920 in a second inductor (e.g., second inductor 220 of FIG. 2) over time. Graphs 900 include a graph 922 of a current 924 in a first diode (e.g., first diode 222 of FIG. 2).

Just before transition time 930, the voltage at terminal 212 is approximately equal to the voltage of supply line 208. After transition time 930, current flows to charge first capacitor 230 and discharge capacitor 232, which occurs with overshoot, as seen in graph 902. First switch 214 is opened, and as a result the current through first switch 214 drops to zero, as seen in graph 906, however the current first inductor 218 begins to fall, as seen in graph 914, i.e., first inductor begins to discharge. The current for first inductor 218 is provided by first diode 222 as seen in graph 922. The overshoot seen in graph 902 begins charging second inductor 220, as seen in graph 918, and the current through second switch 216 begins to rise, as seen in graph 910, it being understood that in this example current flow is shown as negative due to the polarity of the current flow.

In one non-limiting example, the inductance of the load 202 is more than 100 times greater than the combined inductances of the first and second inductors 218, 220. In another non-limiting example, the inductance of the load 202 is more than 1,000 times greater than the combined inductances of the first and second inductors 218, 220.

Figure 3:
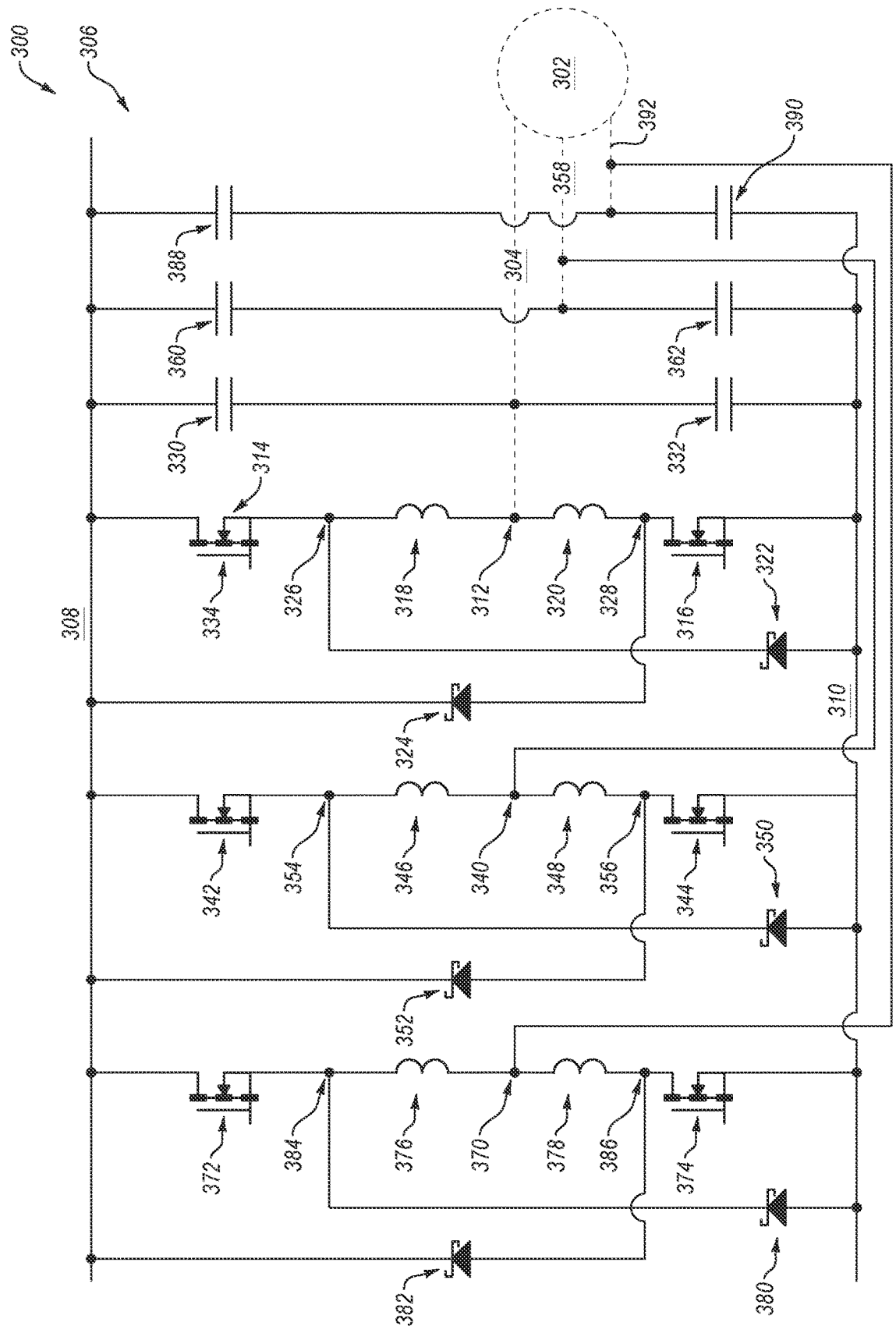
FIG. 3 is a functional block diagram illustrating an apparatus according to one or more examples.

FIG. 3 is a functional block diagram illustrating an apparatus 300 according to one or more examples. Apparatus 300 includes a circuit 306 (which circuit 306 may be an inverter) which may efficiently drive a load 302 (e.g., a multi-phase motor) while limiting dV/dt at multiple terminals of load 302. Circuit 306 may, additionally or alternatively, limit di/dt in circuit 306 (e.g., at a first switch 314 and a second switch 316) and/or in load 302.

In addition to elements that are the same as, or substantially similar to elements of apparatus 100 of FIG. 1 or apparatus 200 of FIG. 2, apparatus 300 includes a third switch 342 coupled between supply line 308 and a second terminal 340. Second terminal 340 may for electrically coupling to a second terminal 358. Apparatus 300 may include a fourth switch 344 coupled between return line 310 and second terminal 340. Apparatus 300 may include a third inductor 346 coupled between third switch 342 and second terminal 340. Apparatus 300 may include a fourth inductor 348 coupled between fourth switch 344 and second terminal 340. Apparatus 300 may include a third diode 350 coupled between return line 310 and an internal node 354 of third switch 342 and third inductor 346. Apparatus 300 may include a fourth diode 352 coupled between supply line 308 and an internal node 356 of fourth switch 344 and fourth inductor 348. Apparatus 300 may include a third capacitor 360 coupled between supply line 308 and second terminal 340. Apparatus 300 may include a fourth capacitor 362 coupled between return line 310 and second terminal 340. As first switch 314 and second switch 316 are to alternately electrically couple first terminal 312 to supply line 308 and return line 310 respectively; third switch 342 and fourth switch 344 may alternately electrically couple second terminal 340 to supply line 308 and return line 310 respectively.

Apparatus 300 may include a fifth switch 372 coupled between supply line 308 and a third terminal 370. Third terminal 370 may be for electrical coupling to a third terminal 392. Apparatus 300 may include a sixth switch 374 coupled between return line 310 and third terminal 370. Apparatus 300 may include a fifth inductor 376 coupled between fifth switch 372 and third terminal 370. Apparatus 300 may include a sixth inductor 378 coupled between sixth switch 374 and third terminal 370. Apparatus 300 may include a fifth diode 380 coupled between return line 310 and an internal node 384 of third switch 342 and fifth inductor 376. Apparatus 300 may include a sixth diode 382 coupled between supply line 308 and an internal node 386 of sixth switch 374 and sixth inductor 378. Apparatus 300 may include a fifth capacitor 388 coupled between supply line 308 and third terminal 370. Apparatus 300 may include a sixth capacitor 390 coupled between return line 310 and third terminal 370. As first switch 314 and second switch 316 are to alternately electrically couple first terminal 312 to supply line 308 and return line 310 respectively; fifth switch 372 and sixth switch 374 may alternately electrically couple third terminal 370 to supply line 308 and return line 310 respectively.

Circuit 306 may drive load 302 (e.g., three-phase electrical motor (e.g., multi-phase motor, without limitation)) by providing drive signals at each of first terminal 304, second terminal 358, and third terminal 392. Circuit 306 may limit dV/dt at each of first terminal 304, second terminal 358, and third terminal 392.

Figure 4:
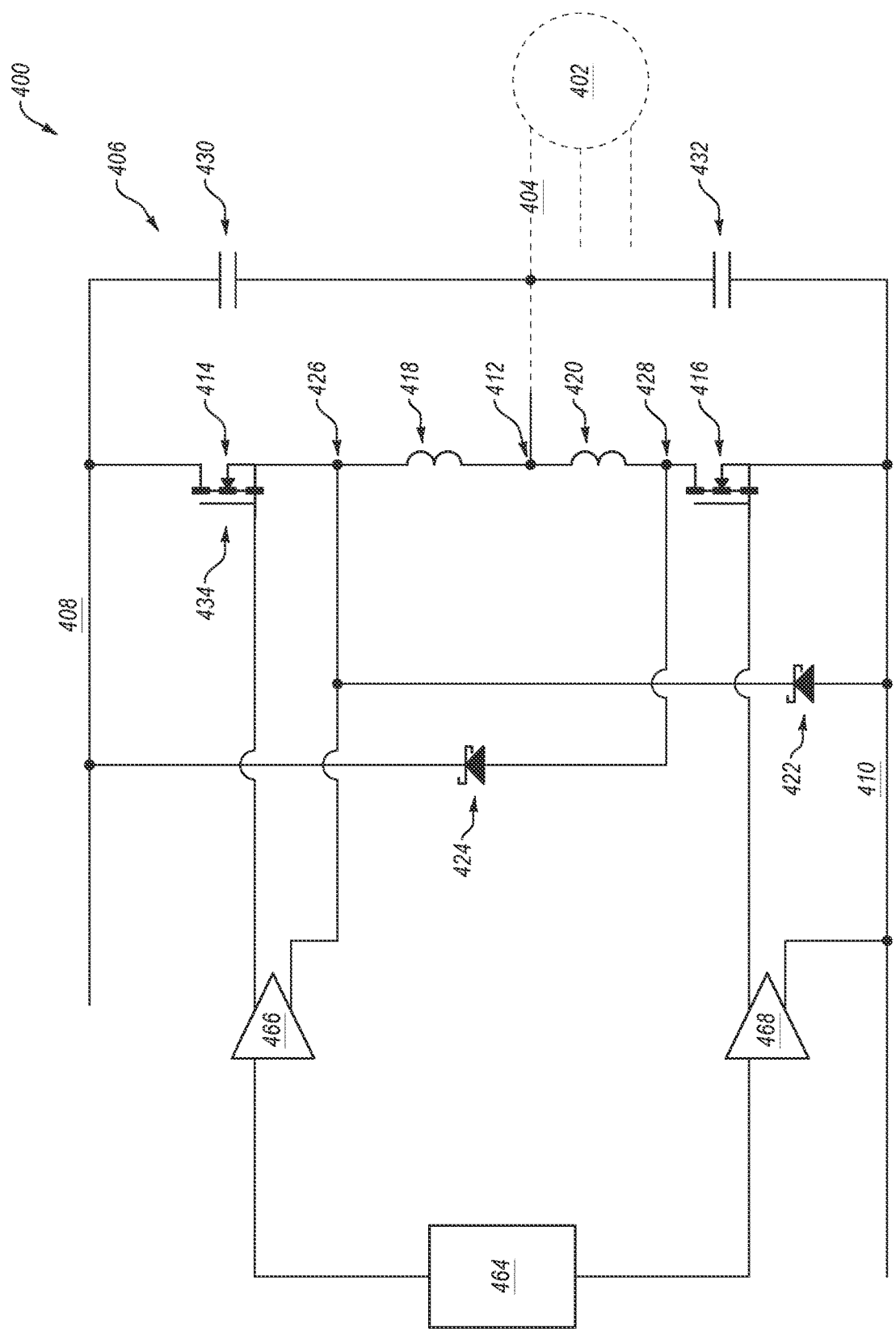
FIG. 4 is a functional block diagram illustrating an apparatus according to one or more examples.

FIG. 4 is a functional block diagram illustrating an apparatus 400 according to one or more examples. Apparatus 400 includes a circuit 406 (which circuit 406 may be an inverter) which may efficiently drive a load 402 (e.g., a multi-phase motor) while limiting dV/dt at a first terminal 404 of load 402. Circuit 406 may, additionally or alternatively, limit di/dt in circuit 406 (e.g., at a first switch 414 and a second switch 416) and/or in load 402.

In addition to elements that are the same as, or substantially similar to elements of apparatus 100 of FIG. 1, apparatus 200 of FIG. 2, or apparatus 300 of FIG. 3, includes a modulator 464, a first gate driver 466, and a second gate driver 468.

Modulator 464 may provide a first control signal for first switch 414 and a second control signal for second switch 416. As a non-limiting example, modulator 464 may be a pulse-width modulator. Modulator 464 may provide the first control signal in phase opposition to the second control signal, with an optional dead time. For example, the first control signal may be high while the second control signal is low and the first control signal may be low while the second control signal is high. The first control signal may be functionally isolated from the second control signal. The functional isolation between the first control signal and the second control signal may be higher than the voltage difference between first internal node 426 and return line 410.

First gate driver 466 may generate a first gate-control signal responsive to the first control signal. The first gate-control signal may be a first square wave which may exhibit voltages suitable to close and open first switch 414. First gate driver 466 includes a grounding reference (not labeled in FIG. 4) to reference first gate driver 466 to first internal node 426, so as to supply the gate voltage referenced to the source of first switch 414.

Second gate driver 468 may generate a second gate-control signal responsive to the second control signal. The second gate-control signal may be a second square wave (which second square wave may be the phase opposite the first square wave) which exhibit voltages suitable to close and open second switch 416. The first gate-control signal and the second gate-control signal may be such that the first switch 414 and the second switch 416 are not closed at the same time. Second gate driver 468 includes a grounding reference (not labeled in FIG. 4) to reference second gate driver 468 to return line 410, so as to supply the gate voltage referenced to the source of second switch 416.

Circuit 406 may include additional elements, e.g., passive elements (not illustrated in FIG. 4) (e.g., between first gate driver 466 and first switch 414 and between second gate driver 468 and second switch 416), to adjust the voltage of the first gate-control signal such that the first gate-control signal is suitable to close and open first switch 414 or to adjust a voltage of the second gate-control signal such that the second gate-control signal is suitable to close and open second switch 416.

Figure 5:
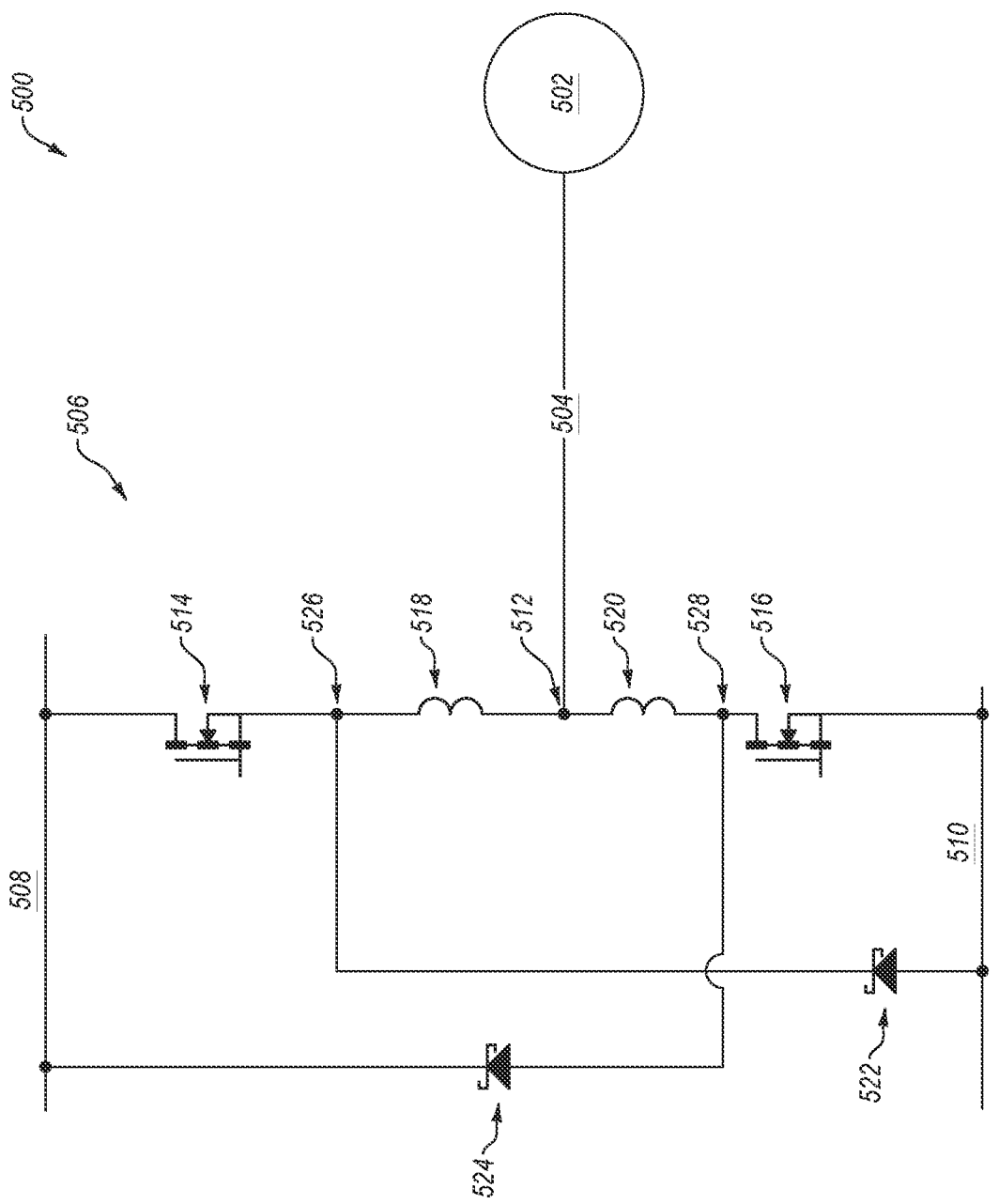
FIG. 5 is a functional block diagram illustrating a system according to one or more examples.

FIG. 5 is a functional block diagram illustrating a system 500 according to one or more examples. System 500 includes a circuit 506 (which circuit 506 may be an inverter) which may efficiently drive a load 502 (e.g., a motor) while limiting dV/dt at a first terminal 504 of load 502. Circuit 506 may, additionally or alternatively, limit di/dt in circuit 506 (e.g., at a first switch 514 and a second switch 516) and/or in load 502.

System 500 may include load 502 (which load 502 may be a motor). System 500 may include circuit 506 coupled between a supply line 508, a return line 510, and a terminal 512. Circuit 506 may provide an oscillating signal to load 502 at terminal 512. Circuit 506 may include first switch 514 to couple supply line 508 with terminal 512. Circuit 506 may include second switch 516 to couple return line 510 with terminal 512. Circuit 506 may include a first inductor 518 coupled between first switch 514 and terminal 512. Circuit 506 may include a second inductor 520 coupled between second switch 516 and terminal 512. Circuit 506 may include a first diode 522 coupled between return line 510 and an internal node 526 of first switch 514 and first inductor 518. Circuit 506 may include a second diode 524 coupled between supply line 508 and an internal node 528 of second switch 516 and second inductor 520.

Figure 6:
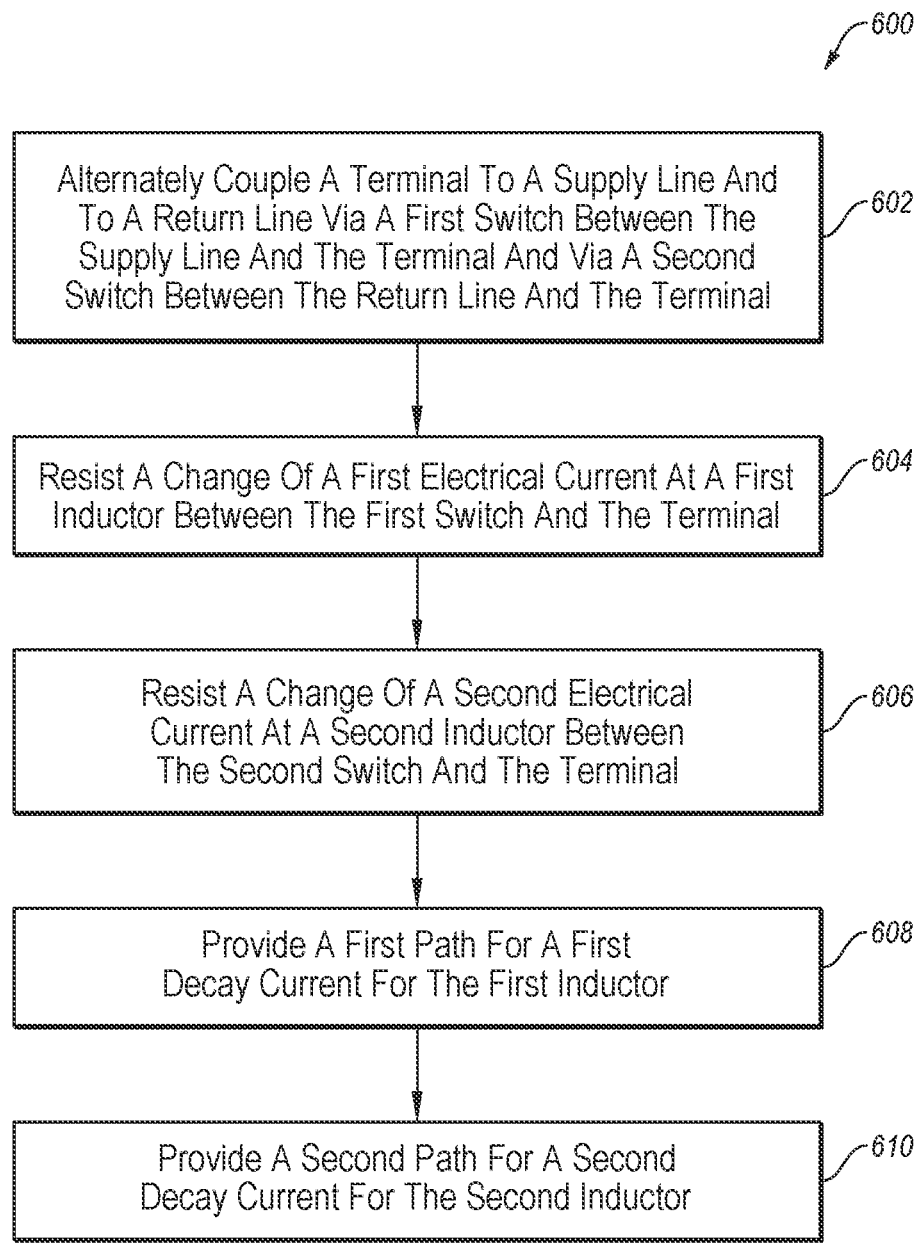
FIG. 6 is a flowchart of a method, according to one or more examples.

FIG. 6 is a flowchart of a method 600, according to one or more examples. At least a portion of method 600 may be performed, in some examples, by a device or system, such as apparatus 100 of FIG. 1, apparatus 200 of FIG. 2, apparatus 300 of FIG. 3, apparatus 400 of FIG. 4, system 500 of FIG. 5, or another device or system. Although illustrated as discrete blocks, various blocks may be divided into additional blocks, combined into fewer blocks, or eliminated, depending on the desired implementation.

At operation 602, a terminal may be alternately coupled to a supply line and to a return line via a first switch between the supply line and the terminal and via a second switch between the return line and the terminal.

At operation 604, a change of a first electrical current may be resisted at a first inductor between the first switch and the terminal. As a non-limiting example, the first electrical current may be through a first inductor e.g., first inductor 118 of FIG. 1, or first inductor 218 of FIG. 2.

At operation 606, a change of a second electrical current may be resisted at a second inductor between the second switch and the terminal. As a non-limiting example, the second electrical current may be through a second inductor e.g., second inductor 120 of FIG. 1, or second inductor 220 of FIG. 2.

At operation 608, a first path may be provided for a first decay current for the first inductor (and the second inductor). As a non-limiting example, the first path may be between the return line and an internal node of the first switch and the first inductor and through a first diode.

At operation 610, a second path may be provided for a second decay current for the second inductor (and the first inductor). As a non-limiting example, the second path may be between an internal node of the second switch and the second inductor and the supply line through a second diode.

Modifications, additions, or omissions may be made to method 600 without departing from the scope of the present disclosure. For example, the operations of method 600 may be implemented in differing order. Furthermore, the outlined operations and actions are only provided as examples, and some of the operations and actions may be optional, combined into fewer operations and actions, or expanded into additional operations and actions without detracting from the essence of the disclosed example.

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

As used in the present disclosure, the terms "module" or "component" may refer to specific hardware implementations may perform the actions of the module or component or software objects or software routines that may be stored on or executed by general purpose hardware (e.g., computer-readable media, processing devices, without limitation) of the computing system. In one or more examples, the different components, modules, engines, and services described in the present disclosure may be implemented as objects or processes that execute on the computing system (e.g., as separate threads, without limitation). While some of the system and methods described in the present disclosure are generally described as being implemented in software (stored on or executed by general purpose hardware), specific hardware implementations or a combination of software and specific hardware implementations are also possible and contemplated.

As used in the present disclosure, the term "combination" with reference to a plurality of elements may include a combination of all the elements or any of various different sub-combinations of some of the elements. For example, the phrase "A, B, C, D, or combinations thereof" may refer to any one of A, B, C, or D; the combination of each of A, B, C, and D; and any sub-combination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," without limitation). As used herein, "each" means "some or a totality." As used herein, "each and every" means "a totality."

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" or "an" means "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, without limitation" or "one or more of A, B, and C, without limitation." is used, in general such a construction is intended to include A alone, B alone, C alone, A and B together, A and C together, B and C together, or A, B, and C together, without limitation.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting examples of the disclosure may include:

Example 1: An apparatus comprising: a circuit coupled between a supply line, a return line, and a terminal, the circuit to provide an oscillating signal to the terminal, the circuit comprising: a first switch to couple the supply line with the terminal; a second switch to couple the return line with the terminal; a first inductor coupled between the first switch and the terminal; a second inductor coupled between the second switch and the terminal; a first diode coupled between the return line and an internal node of the first switch and the first inductor; and a second diode coupled between the supply line and an internal node of the second switch and the second inductor.

Example 2: The apparatus according to Example 1, wherein the first switch to couple the supply line with the terminal responsive to a signal from a modulator.

Example 3: The apparatus according to any of Examples 1 and 2, wherein the signal is a first signal and wherein the second switch to couple the return line with the terminal responsive to a second signal from the modulator.

Example 4: The apparatus according to any of Examples 1 through 3, comprising: a first capacitor coupled between the supply line and the terminal; and a second capacitor coupled between the return line and the terminal.

Example 5: The apparatus according to any of Examples 1 through 4, wherein the first switch comprises a silicon carbide metal-oxide semiconductor field effect transistor.

Example 6: The apparatus according to any of Examples 1 through 5, wherein the first switch and the second switch are to alternately couple the terminal to the supply line and the return line respectively.

Example 7: The apparatus according to any of Examples 1 through 6, wherein the first diode to provide a first path for a first decay current for the first inductor, and wherein the second diode to provide a second path for a second decay current for the second inductor.

Example 8: The apparatus according to any of Examples 1 through 7, wherein the first diode to prevent current to flow from the internal node of the first switch and the first inductor to the return line, and wherein the second diode to prevent current to flow from the supply line to the internal node of the second switch and the second inductor.

Example 9: The apparatus according to any of Examples 1 through 8, wherein the circuit is a first circuit, wherein the terminal is a first terminal, wherein the oscillating signal is a first oscillating signal, and wherein the apparatus comprises: a second circuit coupled between the supply line, the return line, and a second terminal, the second circuit to provide a second oscillating signal to the second terminal, the second circuit comprising: a third switch to couple the supply line with the second terminal; a fourth switch to couple the return line with the second terminal; a third inductor coupled between the third switch and the second terminal; a fourth inductor coupled between the fourth switch and the second terminal; a third diode coupled between the return line and an internal node of the third switch and the third inductor; and a fourth diode coupled between the supply line and an internal node of the fourth switch and the fourth inductor.

Example 10: The apparatus according to any of Examples 1 through 9, comprising: a first capacitor coupled between the supply line and the first terminal; a second capacitor coupled between the return line and the first terminal; a third capacitor coupled between the supply line and the second terminal; and a fourth capacitor coupled between the return line and the second terminal.

Example 11: The apparatus according to any of Examples 1 through 10, wherein the first switch and the second switch are to alternately couple the first terminal to the supply line and the return line respectively and wherein the third switch and the fourth switch are to alternately couple the second terminal to the supply line and the return line respectively.

Example 12: The apparatus according to any of Examples 1 through 11, comprising: a third circuit coupled between the supply line, the return line, and a third terminal, the third circuit to provide a third oscillating signal to the third terminal, the third circuit comprising: a fifth switch to couple the supply line with the third terminal; a sixth switch to couple the return line with the third terminal; a fifth inductor coupled between the fifth switch and the third terminal; a sixth inductor coupled between the sixth switch and the third terminal; a fifth diode coupled between the return line and an internal node of the third switch and the fifth inductor; and a sixth diode coupled between the supply line and an internal node of the sixth switch and the sixth inductor.

Example 13: The apparatus according to any of Examples 1 through 12, wherein the first switch and the second switch are to alternately couple the first terminal to the supply line and the return line respectively, wherein the third switch and the fourth switch are to alternately couple the second terminal to the supply line and the return line respectively, and wherein the fifth switch and the sixth switch are to alternately couple the third terminal to the supply line and the return line respectively.

Example 14: The apparatus according to any of Examples 1 through 13, wherein the first switch to couple the supply line with the first terminal responsive to a first signal from a modulator, wherein the second switch to couple the return line with the first terminal responsive to a second signal from the modulator, wherein the third switch to couple the supply line with the second terminal responsive to a third signal from the modulator, and wherein the fourth switch to couple the return line with the second terminal responsive to a fourth signal from the modulator.

Example 15: The apparatus according to any of Examples 1 through 14, comprising a modulator to provide a first control signal for the first switch and a second control signal for the second switch.

Example 16: The apparatus according to any of Examples 1 through 15, comprising a first gate driver coupled between the modulator and the first switch and a second gate driver coupled between the modulator and the second switch.

Example 17: An apparatus comprising: an inverter for a load, the inverter comprising: a terminal to be coupled to the load; a supply line; a return line; a first switch; a second switch; a first inductor; a second inductor; a first diode; and a second diode, wherein: the first switch is coupled between the supply line and the terminal; the second switch is coupled between the return line and the terminal; the first inductor is coupled between the first switch and the terminal; the second inductor is coupled between the second switch and the terminal; the first diode is coupled between the return line and an internal node of the first switch and the first inductor; and the second diode is coupled between the supply line and an internal node of the second switch and the second inductor.

Example 18: The apparatus according to Example 17, wherein the first switch comprises a silicon carbide metal-oxide semiconductor field effect transistor.

Example 19: The apparatus according to any of Examples 17 and 18, wherein an inductance of the load is greater than an inductance of the first inductor and an inductance of the second inductor.

Example 20: The apparatus according to any of Examples 17 through 19, wherein the load comprises a motor.

Example 21: A method, comprising: alternately coupling a terminal to a supply line and to a return line via a first switch between the supply line and the terminal and via a second switch between the return line and the terminal; resisting change of a first electrical current at a first inductor between the first switch and the terminal; resisting change of a second electrical current at a second inductor between the second switch and the terminal; providing a first path for a first decay current between the return line and an internal node of the first switch and the first inductor through a first diode; and providing a second path for a second decay current between an internal node of the second switch and the second inductor and the supply line through a second diode.

Example 22: A system, comprising: a load; a circuit coupled between a supply line, a return line, and a terminal, the circuit to provide an oscillating signal to a motor at the terminal, the circuit comprising: a first switch to couple the supply line with the terminal; a second switch to couple the return line with the terminal; a first inductor coupled between the first switch and the terminal; a second inductor coupled between the second switch and the terminal; a first diode coupled between the return line and an internal node of the first switch and the first inductor; and a second diode coupled between the supply line and an internal node of the second switch and the second inductor.

While the present disclosure has been with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:

1. An apparatus comprising:
    a circuit coupled between a supply line, a return line, and a terminal, the circuit to provide an oscillating signal to the terminal, the circuit comprising:
    a first switch to couple the supply line with the terminal;
    a second switch to couple the return line with the terminal;
    a first inductor coupled between the first switch and the terminal;
    a second inductor coupled between the second switch and the terminal;
    a first diode coupled between the return line and an internal node of the first switch and the first; inductor, wherein the first diode is coupled in parallel with a first circuit that includes the first switch and the first inductor; and
    a second diode coupled between the supply line and an internal node of the second switch and the second inductor, wherein the second diode is coupled in parallel with a second circuit that includes the second switch and the second inductor.

2. The apparatus of claim 1, wherein the first switch to couple the supply line with the terminal responsive to a signal from a modulator.

3. The apparatus of claim 2, wherein the signal is a first signal and wherein the second switch to couple the return line with the terminal responsive to a second signal from the modulator.

4. The apparatus of claim 1, comprising:
    a first capacitor coupled between the supply line and the terminal; and
    a second capacitor coupled between the return line and the terminal.

5. The apparatus of claim 1, wherein the first switch comprises a silicon carbide metal-oxide semiconductor field effect transistor.

6. The apparatus of claim 1, wherein the first switch and the second switch are to alternately couple the terminal to the supply line and the return line respectively.

7. The apparatus of claim 1, wherein the first diode to provide a first path for a first decay current for the first inductor, and wherein the second diode to provide a second path for a second decay current for the second inductor.

8. The apparatus of claim 1, wherein the first diode to prevent current to flow from the internal node of the first switch and the first inductor to the return line, and wherein the second diode to prevent current to flow from the supply line to the internal node of the second switch and the second inductor.

9. The apparatus of claim 1, wherein the circuit is a first circuit, wherein the terminal is a first terminal, wherein the oscillating signal is a first oscillating signal, and wherein the apparatus comprises:
    a second circuit coupled between the supply line, the return line, and a second terminal, the second circuit to provide a second oscillating signal to the second terminal, the second circuit comprising:
    a third switch to couple the supply line with the second terminal;
    a fourth switch to couple the return line with the second terminal;
    a third inductor coupled between the third switch and the second terminal;
    a fourth inductor coupled between the fourth switch and the second terminal;
    a third diode coupled between the return line and an internal node of the third switch and the third inductor; and
    a fourth diode coupled between the supply line and an internal node of the fourth switch and the fourth inductor.

10. The apparatus of claim 9, comprising:
    a first capacitor coupled between the supply line and the first terminal;
    a second capacitor coupled between the return line and the first terminal;
    a third capacitor coupled between the supply line and the second terminal; and
    a fourth capacitor coupled between the return line and the second terminal.

11. The apparatus of claim 9, wherein the first switch and the second switch are to alternately couple the first terminal to the supply line and the return line respectively and wherein the third switch and the fourth switch are to alternately couple the second terminal to the supply line and the return line respectively.

12. The apparatus of claim 9, comprising:
    a third circuit coupled between the supply line, the return line, and a third terminal, the third circuit to provide a third oscillating signal to the third terminal, the third circuit comprising:
    a fifth switch to couple the supply line with the third terminal;
    a sixth switch to couple the return line with the third terminal;

a fifth inductor coupled between the fifth switch and the third terminal;
a sixth inductor coupled between the sixth switch and the third terminal;
a fifth diode coupled between the return line and an internal node of the third switch and the fifth inductor; and
a sixth diode coupled between the supply line and an internal node of the sixth switch and the sixth inductor.

13. The apparatus of claim 12, wherein the first switch and the second switch are to alternately couple the first terminal to the supply line and the return line respectively, wherein the third switch and the fourth switch are to alternately couple the second terminal to the supply line and the return line respectively, and wherein the fifth switch and the sixth switch are to alternately couple the third terminal to the supply line and the return line respectively.

14. The apparatus of claim 9, wherein the first switch to couple the supply line with the first terminal responsive to a first signal from a modulator, wherein the second switch to couple the return line with the first terminal responsive to a second signal from the modulator, wherein the third switch to couple the supply line with the second terminal responsive to a third signal from the modulator, and wherein the fourth switch to couple the return line with the second terminal responsive to a fourth signal from the modulator.

15. The apparatus of claim 1, comprising a modulator to provide a first control signal for the first switch and a second control signal for the second switch.

16. The apparatus of claim 15, comprising a first gate driver coupled between the modulator and the first switch and a second gate driver coupled between the modulator and the second switch.

17. An apparatus comprising:
an inverter for a load, the inverter comprising:
a terminal to be coupled to the load;
a supply line;
a return line;
a first switch;
a second switch;
a first inductor;
a second inductor;
a first diode; and
a second diode,
wherein:
the first switch is coupled between the supply line and the terminal;
the second switch is coupled between the return line and the terminal;
the first inductor is coupled between the first switch and the terminal;
the second inductor is coupled between the second switch and the terminal;
the first diode is coupled to the return line and directly to an internal node of the first switch and the first inductor; and
the second diode is coupled to the supply line and directly to an internal node of the second switch and the second inductor.

18. The apparatus of claim 17, wherein the first switch comprises a silicon carbide metal-oxide semiconductor field effect transistor.

19. The apparatus of claim 17, wherein an inductance of the load is greater than an inductance of the first inductor and an inductance of the second inductor.

20. The apparatus of claim 17, wherein the load comprises a motor.

21. A method, comprising:
alternately coupling a terminal to a supply line and to a return line via a first switch between the supply line and the terminal and via a second switch between the return line and the terminal;
resisting change of a first electrical current at a first inductor between the first switch and the terminal;
resisting change of a second electrical current at a second inductor between the second switch and the terminal;
providing a first path for a first decay current between the return line and an internal node of the first switch and the first inductor through a first diode; and
providing a second path for a second decay current between an internal node of the second switch and the second inductor and the supply line through a second diode.

22. A system, comprising:
a load;
a circuit coupled between a supply line, a return line, and a terminal, the circuit to provide an oscillating signal to a motor at the terminal, the circuit comprising:
a first switch to couple the supply line with the terminal;
a second switch to couple the return line with the terminal;
a first inductor coupled between the first switch and the terminal;
a second inductor coupled between the second switch and the terminal;
a first diode coupled to the return line and directly to an internal node of the first switch and the first inductor; and
a second diode coupled to the supply line and directly to an internal node of the second switch and the second inductor.

23. The system of claim 22, wherein an inductance of the load is greater than an inductance of the first inductor and an inductance of the second inductor.

24. The system of claim 22, wherein the load comprises a motor.

* * * * *